Patented Jan. 8, 1952

UNITED STATES PATENT OFFICE 2,581,373

ESTERS OF HYDROXY ACETYLATED BLOWN RICINOLEIC ACID COMPOUNDS WITH OXYALKYLATED PHENOL ALDEHYDE RESINS

Melvin De Groote, St. Louis, and Bernhard Keiser, Webster Groves, Mo., assignors to Petrolite Corporation, Ltd., Wilmington, Del., a corporation of Delaware No Drawing. Application December 10, 1948, Serial No. 64,447

11 Claims. (Cl. 260—19)

The present invention is concerned with certain new chemical products, compounds, or compositions, which have useful applications in various arts. This invention is a continuation-in-part of our co-pending application, Serial No. 734,202, filed March 12, 1947, and now abandoned. It includes methods or procedures for manufacturing said new chemical products, compounds, or compositions, as well as the products, compounds, or compositions themselves.

Said new compositions are esters in which the acyl radical is that of the fatty acid of a hydroxyacetylated drastically-oxidized ricinoleic compound selected from the class consisting of castor oil, triricinolein, diricinolein, monoricinolein, superglycerinated castor oil, castor oil estolides, polyricinoleic acid, and ricinoleic acid, and the alcoholic radical is that of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

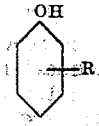

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application, Serial No. 64,446, filed December 10, 1948, now Patent 2,541,992, issued February 20, 1951. See also our co-pending application, Serial No. 64,469, filed December 10, 1948. The new products are useful as wetting, detergent and levelling agents in the laundry, textile and dyeing industries; as wetting agents and detergents in the acidwashing of building stone and brick; as wetting agents and spreaders in the application of asphalt in road building and the like; as a flotation reagent in the flotation separation of various aqueous suspensions containing negatively charged particles such as sewage, coal washing waste water, and various trade wastes and the like; as germicides, insecticides, emulsifying agents, as for example, for cosmetics, spray oils, water-repellent textile finishes; as lubricants, etc.

The oxyalkylated resins, used to provide the alcoholic radical of the new esters, are described in our Patents 2,499,370, granted March 7, 1950, and 2,541,991, granted February 20, 1951, and reference is made to those patents for a description of the phenol-aldehyde resins used and their oxyalkylation to produce the alcoholic products. For specific examples of the resins, reference is made to Examples 1a through 103a of Patent 2,499,370. For examples of the oxyalkylated products, reference is made to Examples 1b through 18b of Patent 2,499,370 and to the tables which appear in columns 51 through 56 thereof, and also is made to the tables which appear at columns 31 through 46 of Patent 2,541,991. The hydroxy acetylated drastically-oxidized ricinoleic compounds which provide the acyl radicals of the new esters are described in detail in Patent 2,375,530, granted May 8, 1945, and reference is made to that patent for description of these products. For specific examples of these products reference is made to Examples 1 through 4 of this patent.

It will be noted that having obtained a compound which is essentially a polyhydric alcohol, i. e., an oxyalkylated resin of the type herein contemplated, one can produce esters by any one of the various procedures employed for producing esters of detergent-forming acids of the common polyhydric alcohols. As is well known, one may employ not only the fatty acid itself, but also any suitable derivative thereof, for instance, the acylchloride, the anhydride, etc. In some instances, trans-esterification or cross-esterification will be employed. For instance, the oxyalkylated derivatives can be heated with the methyl or ethyl ester of the selected acid or selected hydroxy-acetylated drastically-oxidized compound, in presence of the alkaline catalyst, so as to eliminate methyl or ethyl alcohols. Trans-esterification or cross-esterification can be employed in connection with a glyceride, such as the use of hydroxyacetylated drastically-oxidized castor oil with the formation of glycerine, which, under conditions of reaction, probably polymerize to give polyglycerols, and thus gives a significant and many times a major proportion, of the desired ester. As to a rather complete review of the preparation of polyhydric alcohol esters of fatty acids, see Chemical Review, 33, 257–349 (1943).

*Example 1d*

An acidic hydroxyacetylated drastically-oxidized ricinoleic acid compound having a free ricinoleic acid carboxyl is obtained in the manner previously described, or some obvious modification thereof. For instance, ricinoleic acid, di-ricinoleic acid, or triricinoleic acid, or a mixture thereof, is subjected to drastic oxidation and then to hydroxyacetylation. The product is analyzed to determine its acid value. An alternate procedure is to employ a hydroxyacetylated drastically-oxidized ricinoleic acid compound and to subject it to acid saponification so as to yield the corresponding fatty acids. In any event, an oxyalkylated derivative, such as Example 122b of Patent 2,541,991, is esterified with a hydroxyacetylated drastically-oxidized ricinoleic acid compound in acidic form, in an amount sufficient to convert approximately one-fourth of the polyglycol radicals into the fatty acid ester. The hydroxyl value of the oxyalkylated derivative can be calculated without determination, based on the hydroxyl value and weight of the phenol-aldehyde resin originally employed, plus the increase in weight after oxyalkylation. If glycide or methylglycide is employed, allowance must be made for the polyhydric character of the oxyalkylating reactant. In any event, if desired, the hydroxyl value of the oxyalkylated product can be determined by the Verley-Bölsing method, or any other acceptable procedure. The esterification reaction is conducted in any conventional manner, such as that employed for the preparation of the higher fatty acid esters of phenoxyethanol.

Fatty acids of the kind described, i. e., hydroxylated drastically-oxidized fatty acids, show at least some solubility in the oxyalkylated derivatives of the kind shown in the previous examples, even though this is not necessarily true of the glycerides of the fatty acids. In this instance reference is made to the oxyalkylated derivatives in absence of a solvent. Since esterification is best conducted in a system, it is our preference to add xylene, or even a higher boiling solvent such as mesitylene, cymene, tetralin or the like and conduct esterification in such consolute mixture. It is not necessary to add all the fatty acid at one time. One may add a quarter or half the total amount to be esterified, and after such portion of the reactant has combined, then add more of the specifically described fatty acid. The solubility of the specifically described fatty acid, of course, increases as the hydroxyl radical is replaced by an ester radical. This is also true if one resorts to trans-esterification or cross-esterification with the glyceride or low molal alcohol ester.

Our preference is to have present a substantial amount of xylene or higher boiling, water-insoluble solvent, and to distill under a reflux condenser arrangement, so that water resulting from esterification is volatilized and condensed along with the xylene vapor in a suitably arranged trap. The amount of xylene employed is approximately equal to one-half the weight of the mixed reactants. The water should be removed from the trap, either manually or automatically, and the xylene returned continuously for further distillation. Such reaction is hastened if a small amount of dry hydrochloric acid gas is continuously injected into the esterification mixture. When the reaction is completed, the xylene is removed by distillation. Small amounts of unreacted, specifically described fatty acid can be converted into the methyl or ethyl ester and removed by vacuum distillation, or permitted to remain. For example, an excess of anhydrous ethyl alcohol may be added, and reacted so as to esterify any residual specifically described fatty acid, and then such excess of ethyl alcohol may be distilled off as a 95% alcohol–5% water mixture, and thus, the water resulting from esterification with the alcohol can be removed.

However, even where the amount of specifically described fatty acid employed is stoichiometrically equal to the hydroxyl radicals present, we have not found it desirable to take any undue precautions to eliminate any residual specifically described fatty acid. As a matter of fact, numerous examples include the present one and those subsequently described which yield partial or fractional esters in which there are present residual hydroxyl radicals. Under such circumstances there are substantially no free fatty acid radicals present, and the products obtained by partial esterification, instead of complete esterification, represent the most valuable type. A sulfonic acid, such as toluene sulfonic acid, may be added in amounts of ½% to 1% to act as a catalyst.

As a specific example the following ratios were used:

| | Grams |
|---|---|
| Xylene-containing oxyalkylated resin 122b of Patent 2,541,991 | 1110 |
| Product identified as Example 1 of Patent 2,375,530 | 263 |
| Xylene | 250 |
| Para-toluene sulfonic acid | 15 |

The above mixture was placed in a reflux vessel with appropriate condenser and refluxed at a temperature of 140° to 150° C. for approximately 4 to 6 hours, but in any event until the amount of water was equal to at least theoretical. (4.5 cc.) Our experience has been, however, that due to moisture in the components or due to etherization, or for some other reason, the yield of water is apt to be 10% to 15% higher by the time the reaction has gone to completion or equilibrium.

The oxyalkylated resins vary from tacky solids to thick, viscous liquids, and the color varies from a light amber—almost water-white—to a dark or blackish color, particularly a reddish-black in the case of resins obtained using furfural or benzaldehyde. Fatty products obtained by oxidation are usually reddish-amber in color. Sometimes they may be even dark amber in color. They are generally viscous liquids, apt to be tacky and sometimes show a consistency just short of the sub-rubbery stage. The esters obtained are apt to show physical properties, as far as viscosity and color go, somewhat intermediate between the same properties of the initial reactants. At times, they may be even more viscous in body and darker in appearance than either reactant. Part of this added darkening is the result of the sulfonic acid catalyst employed. In a general way, this characterizes all the subsequent esters described, as far as properties go, when the solvent is removed. We generally remove a small amount of the sample, evaporate the solvent on a steam-bath overnight, and examine the residue. For most applications, particularly breaking of oil field emulsions, the color is immaterial and there is no real advantage in removing the solvent. For this reason no further comment will be directed to these particular properties.

*Example 2d*

The same procedure was followed as in Example 1d, preceding, except that the amount of described hydroxyacetylated drastically-oxidized ricinoleic acid compound fatty acid employed was sufficient to convert one-half of the polyglycol radicals into ester form.

The following ratios were used in a specific example:

| | Grams |
|---|---|
| Xylene-containing oxyalkylated resin 118b of Patent 2,541,991 | 1294 |
| Product identified as Example 3 of Patent 2,375,530 | 600 |
| Xylene | 200 |
| Para-toluene sulfonic acid | 12 |

The procedure employed was the same as in Example 1d, preceding, except that the amount of water evolved was approximately 10 cc.

*Example 3d*

The same procedure was followed as in Example 1d, preceding, except that the amount of described hydroxyacetylated drastically-oxidized ricinoleic acid compound fatty acid employed was sufficient to convert three-fourths of the polyglycol radicals into ester form.

The following ratios were used in a specific example:

| | Grams |
|---|---|
| Xylene-containing oxyalkylated resin 105b of Patent 2,541,991 | 554 |
| Product identified as Example 4 of Patent 2,375,530 | 840 |
| Xylene | 225 |
| Para-toluene sulfonic acid | 10 |

The procedure employed was the same as in Example 1d, preceding. The amount of water evolved was approximately 14 cc.

*Example 4d*

The same procedure was followed as in Example 1d, preceding, except that the amount of described hydroxyacetylated drastically-oxidized ricinoleic acid compound fatty acid employed was sufficient to convert substantially all of the polyglycol radicals into ester form. As a specific example the following ratios were used:

| | Grams |
|---|---|
| Xylene-containing oxyalkylated resin 108b of Patent 2,541,991 | 1213 |
| Product identified as Example 2 of Patent 2,375,530 | 1125 |
| Xylene | 200 |
| Para-toluene sulfonic acid | 29 |

The same procedure was followed as in Example 1d, preceding, except that the amount of water evolved was approximately 18.5 cc.

*Example 5d*

The same procedure was followed as in Examples 1d to 4d, preceding, except that the oxyalkylated derivative was a resin exemplified by Example 112b of Patent 2,541,991. In a specific example the following ratios were used:

| | Grams |
|---|---|
| Xylene-containing oxyalkylated resin 112b of Patent 2,541,991 | 619 |
| Product identified as Example 1 of Patent 2,375,530 | 525 |
| Xylene | 150 |
| Para-toluene sulfonic acid | 8 |

The procedure employed was the same as in Example 1d, preceding, and the reaction was stopped when 5 cc. of water had been eliminated.

*Example 6d*

The same procedure was followed as in Examples 1d to 4d, preceding, except that the oxyalkylated resin employed was the one exemplified by Example 125d of Patent 2,541,991. The following ratios were employed in a specific example:

| | Grams |
|---|---|
| Xylene-containing oxyalkylated resin 125b of Patent 2,541,991 | 511 |
| Product identified as Example 3 of Patent 2,375,530 | 1200 |
| Xylene | 250 |
| Para-toluene sulfonic acid | 14 |

The procedure followed was the same as in Example 1d, preceding, except that at the end of the reaction period (6 hours) the amount of water evolved was 18.5 grams.

*Example 7d*

The same procedure was followed as in the preceding examples, except that the reaction was conducted by means of the ethyl or methyl ester instead of a corresponding acid. The ethyl or methyl ester can be obtained in any one of various ways. The previous description includes the hydroxyacetylation of the ethyl or methyl ester of ricinoleic acid, diricinoleic acid, or triricinoleic acid, preceded by drastic oxidation. A procedure equally suitable is to obtain a similar derivative from the glyceride, to wit, a product of the kind described under the headings of Examples 1 to 4 of Patent 2,375,530, inclusive. Such product can be converted into the methyl or ethyl ester by the usual alcoholysis proceeding, employing anhydrous methyl alcohol, or anhydrous ethyl alcohol and a catalyst, such as an alkaline material. Such procedure is conventional; see, for example, U. S. Patent No. Re. 22,751, reissued April 30, 1946, to Trent. In such procedure the liberated glycerol is discarded. We prefer to use the methyl or ethyl ester obtained by the transposition of a hydroxyacetylated drastically-oxidized triricinolein. The reaction involving the second transposition with the oxyalkylated thermoplastic resin is preferably conducted in the absence of any solvent, or if a solvent be employed, it should be fairly high boiling, such as xylene. Instead of using an acid catalyst, an alkali such as caustic soda or sodium methylate is employed. The amount used varies from one-tenth of 1% to 1%. An average value may be in the neighborhood of one-half of 1%. The reaction is conducted preferably with the methyl ester, which results in the elimination of methanol. In the presence of a solvent, such as xylene, the methanol might distill over with the xylene and, if so, can be removed by washing with water, followed by removal of any moisture from the xylene with subsequent return of the xylene to the reaction vessel. However, any suitable procedure and any suitable catalyst may be employed so as to form the ester by elimination of a low molal alcohol, particularly methanol. It is to be noted that by varying the amounts of the methyl ester added to the oxyalkylated resin one can introduce varying proportions of the acyl radical just as readily as if the acid itself were employed. It is intended, of course, to contemplate an entire range of such compounds comparable to those previously described. Obviously, completeness of reaction can be determined in any one of a number of ways, such as determination of the amount of low molal alcohol volatilized.

Example 8d

The same procedure was followed as in the preceding examples, except that the esters were produced by cross-esterification or trans-esterification, employing the glyceride so as to result in the formation of a non-volatile alcohol instead of a volatile alcohol as in the preceding examples. The catalyst employed was an alkaline catalyst and the temperature employed was approximately 200° C. to 225° C. The time of reaction may vary somewhat, but generally requires 3 to 8 hours. The temperature should be high enough to insure trans-esterification in presence of the alkaline catalyst but in any event should be below the point of pyrolysis as far as the oxyalkylated derivative of the fatty acid compound is concerned. As a rule, pyrolysis may take place at any temperature above 250° C. We prefer to conduct the reaction by simply employing derivatives of the kind described under the headings of Examples 1 to 4 of Patent 2,375,530, inclusive, and mix such reactants with the appropriate amount of oxyalkylated resins of the kind described so that if reaction is complete and all the acyl groups originally attached to the glycerol radical become transposed to the polyglycerol radical, then by using variations of reactants one will obtain the same range, as described under the previous headings of Examples 1d to 6d, preceding.

In reactions of this kind with the liberation of a non-volatile alcohol it is quite likely that the reaction does not go to completion. However, the equilibrium apparently permits a significant or substantial yield, due in part to the fact that the glycerol forms polyglycerols with comparative ease, whereas, the hydroxyl radicals of the oxyalkylated derivatives my etherize to a lesser degree. There is also the possibility that, in part, the glycerol may etherize with the oxyalkylated derivative. This brings about the same result as if the oxyalkylated derivative had been treated with a mole of glycide as a terminal reactant.

The solubility of the esters shows variation of substantially the same kind shown by the oxyethylated resins except, as a rule, any esterification tends to decrease solubility in water (subject to the exceptional instances noted in the preceding paragraph) and perhaps to a lesser extent in polar solvents tends to increase solubility in organic solvents particularly in non-polar organic solvents. This is obvious insofar that the esters herein contemplated need not be total esters but may be fractional as well. Thus, the range of esters includes such wide variations in composition and solubilities.

As has been pointed out previously the esters as prepared in previous examples usually have a solvent, such as xylene or the like, present. Our preference is to leave such solvent present when the products are employed for demulsification or similar purposes. Needless to say, the solvent can be eliminated by evaporation or distillation, including vacuum distillation. If desired, the final product can be neutralized with ammonia or caustic potash or caustic soda to the methyl orange end point so as to eliminate the acidity due to any sulfonic acid employed as a catalyst. If desired, any residual carboxyl acidity can be eliminated by further neutralization.

Attention is directed to the following fact. The oxylkylated resins herein used as intermediate materials for further reaction to provide more complex derivatives are characterized by having certain minimum hydrophile properties as described, and it is particularly desirable that these hydrophile properties be sufficient to produce an emulsion when mixed with xylene in the manner previously described.

Needless to say, when a derivative is formed, such derivative may have somewhat altered hydrophile character, or, stated another way, may have an altered hydrophobe-hydrophile balance. If an ester is prepared from a high molal acid, hydrophile character is increased. If such ester is prepared from sulfo benzoic acid or the like, the hydrophile character may be enhanced. This is also true in even more complicated derivatives, such as the introduction of a quaternary nitrogen atom radical. In the formation of esters, the hydrophobe-hydrophile balance is affected by the factor of whether one prepares a complete or partial ester. In a general way, although the herein described compounds are valuable for various purposes, particularly demulsification, even though the hydrophobe character may be increased somewhat and the hydrophile character decreased, yet when the same test is applied to the derivatives as is applied to the oxyalkylated resins and when such derivatives also show at least such minimum hydrophile character, they are unquestionably most advantageous, particularly for use as demulsifiers. Thus, in the hereto appended claims in pointing out the invention in such specific character, at least part of the claims are directed to the derivatives in which the derivative meets the same final test in regard to the production of a xylene emulsion. Stated another way, the final derivative must be at least as hydrophile or more so than the minimum requirement for the oxyalkylated resin as defined.

We claim:

1. An ester in which the acyl radical is that of the fatty acid of a hydroxyacetylated blown ricinoleic acid compound selected from the class consisting of blown castor oil, blown triricinolein, blown diricinolein, blown monoricinolein, blown superglycerinated castor oil, superglycerinated blown castor oil, blown ricinoleic acid, blown polyricinoleic acid and blown castor oil estolides, and the alcoholic radical is that of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than two; said phenol being of the formula

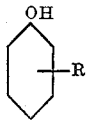

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

2. An ester in which the acyl radical is that of the fatty acid of a hydroxyacetylated blown ricinoleic acid compound selected from the class consisting of blown castor oil, blown triricinolein, blown diricinolein, blown monoricinolein, blown superglycerinated castor oil, superglycerinated blown castor oil, blown ricinoleic acid, blown polyricinoleic acid and blown castor oil estolides, and the alcoholic radical is that of certain hydrophile polyhydric synthetic products; said hydrophile synthetic products being oxyethylation products of (A) ethylene oxide, and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than two; said phenol being of the formula

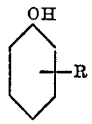

in which R is a hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said ester, as well as said oxyethylated resin, in an equal weight of xylene are sufficient to produce an emulsion when said xylene solution is shaken vigorously with one to three volumes of water.

3. An ester in which the acyl radical is that of the fatty acid of a hydroxyacetylated blown ricinoleic acid compound selected from the class consisting of blown castor oil, blown triricinolein, blown diricinolein, blown monoricinolein, blown superglycerinated castor oil, superglycerinated blown castor oil, blown ricinoleic acid, blown polyricinoleic acid and blown castor oil estolides, and the alcoholic radical is that of certain hydrophile polyhydric synthetic products; said hydrophile synthetic products being oxyethylation products of (A) ethylene oxide; and (B) an oxyethylation-susceptible, fusible, organic solvent-soluble, water-insoluble, low-stage phenol-formaldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than two; said phenol being of the formula

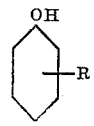

in which R is an aliphatic hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said ester, as well as said oxyethylated resin, in an equal weight of xylene are sufficient to produce an emulsion when said xylene solution is shaken vigorously with one to three volumes of water.

4. The product of claim 2 wherein R is substituted in the para position.

5. The product of claim 2 wherein R is a butyl radical substituted in the para position.

6. The product of claim 2 wherein R is an amyl radical substituted in the para position.

7. The product of claim 2 wherein R is a nonyl radical substituted in the para position.

8. The product of claim 3 wherein R is substituted in the para position.

9. The product of claim 3 wherein R is a butyl radical substituted in the para position.

10. The product of claim 3 wherein R is an amyl radical substituted in the para position.

11. The product of claim 3 wherein R is a nonyl radical substituted in the para position.

MELVIN DE GROOTE.
BERNHARD KEISER.

No references cited.